UNITED STATES PATENT OFFICE.

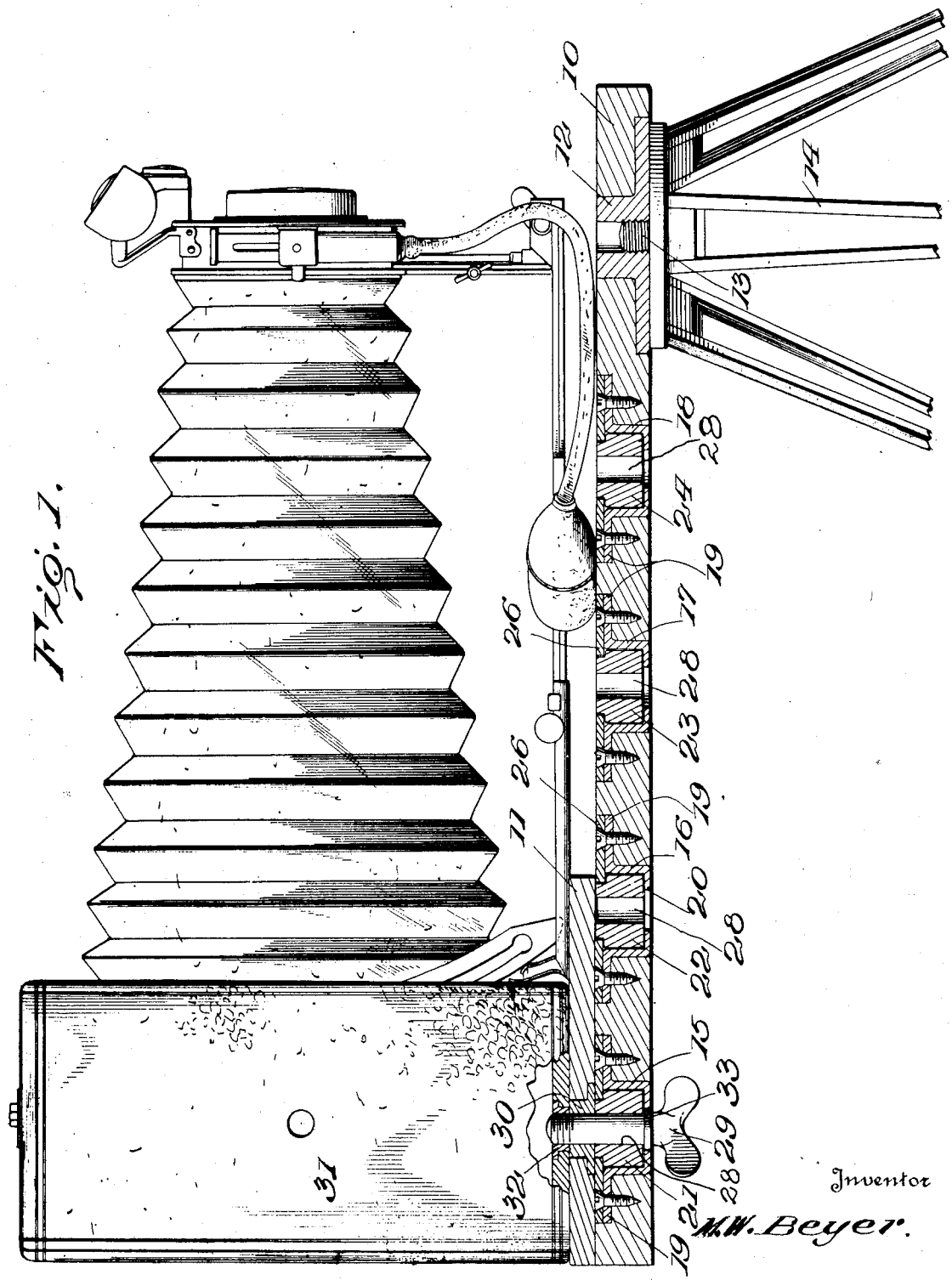

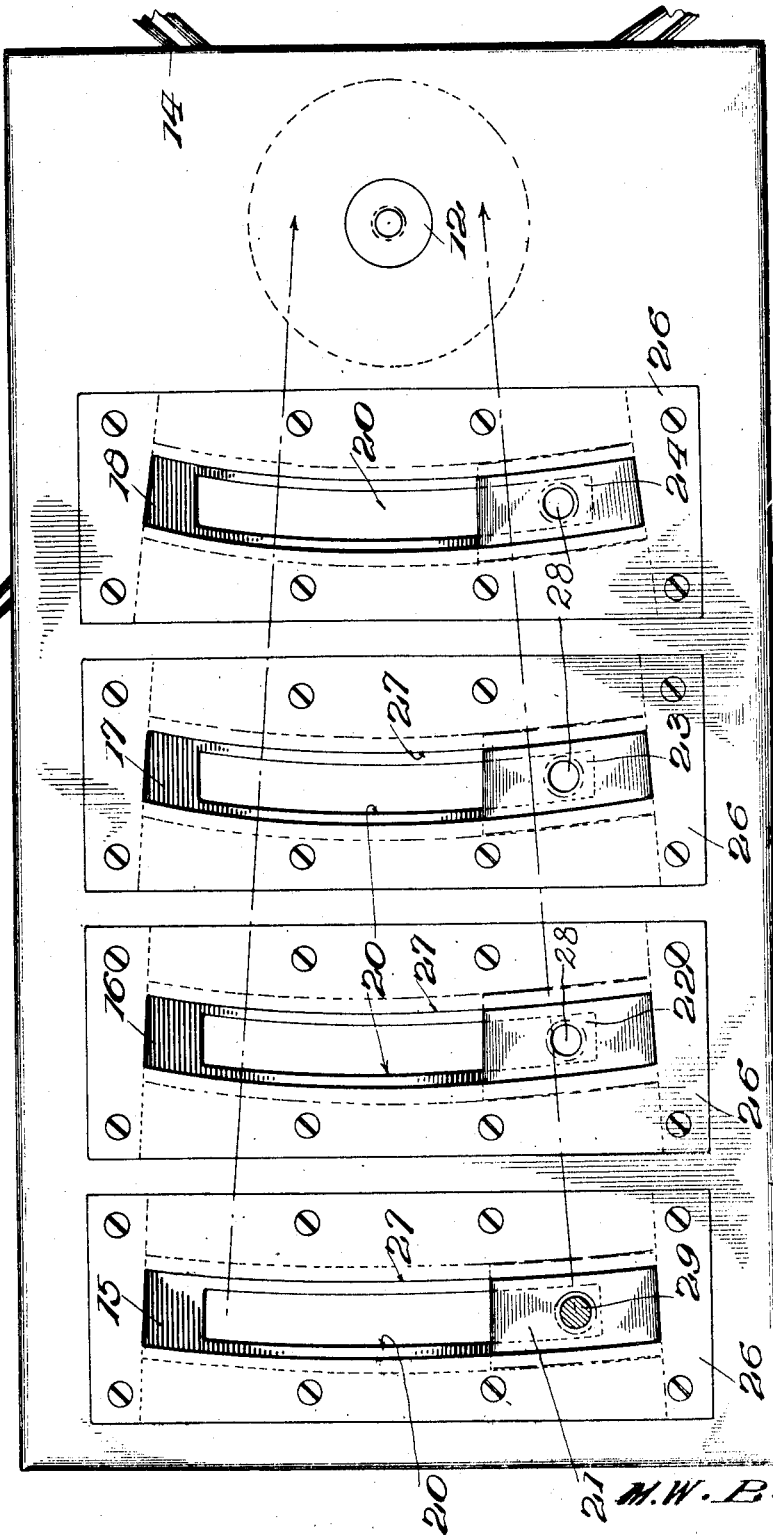

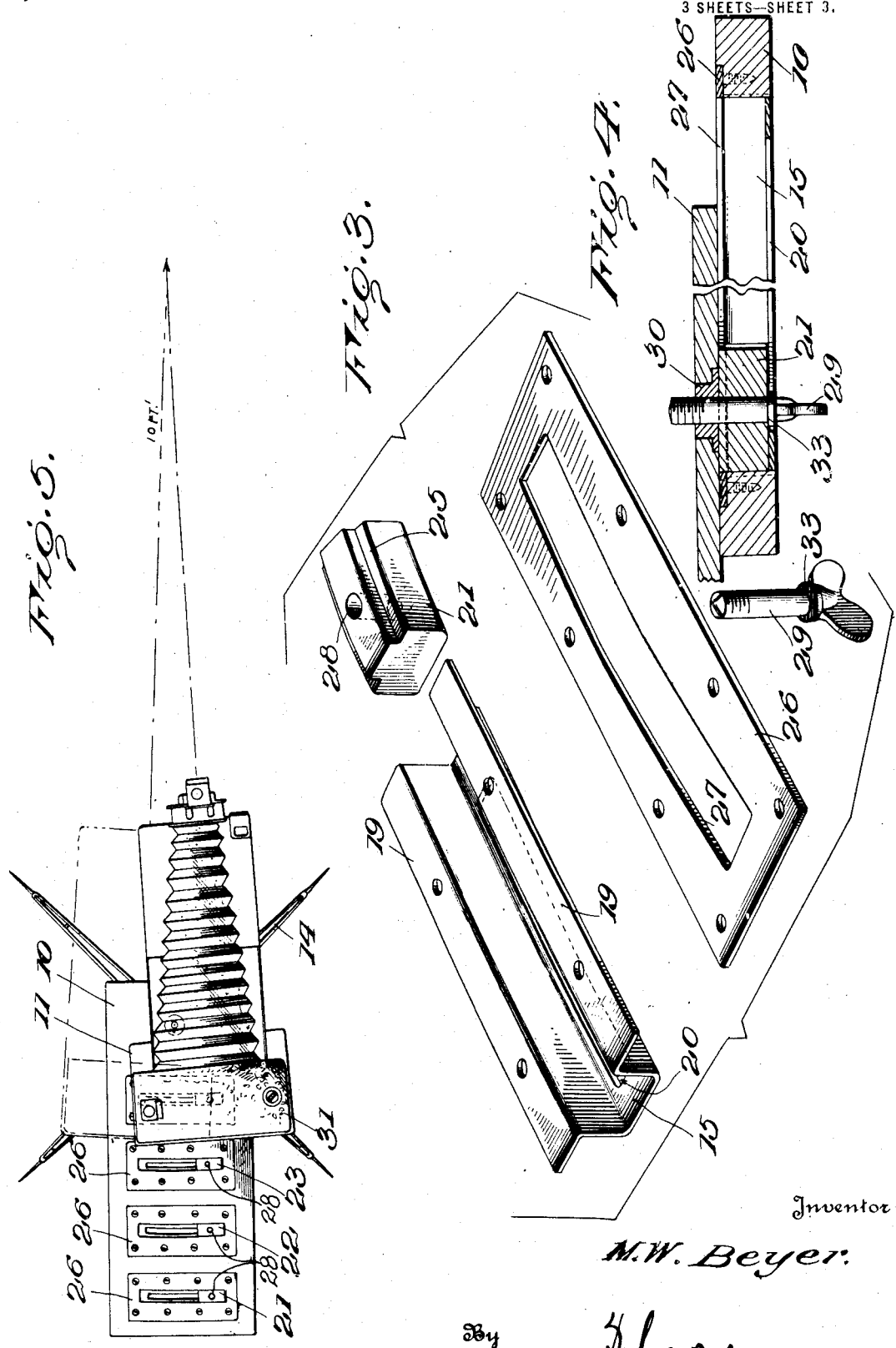

MAX WM. BEYER, OF EDGEWATER, NEW JERSEY.

STEREOSCOPIC ATTACHMENT FOR CAMERAS.

1,312,675.    Specification of Letters Patent.    Patented Aug. 12, 1919.

Application filed October 23, 1917, Serial No. 198,150.   Renewed January 8, 1919.   Serial No. 270,211.

*To all whom it may concern:*

Be it known that I, MAX WILLIAM BEYER, a citizen of the United States, residing at Edgewater, in the county of Bergen and State of New Jersey, have invented certain new and useful Improvements in Stereoscopic Attachments for Cameras, of which the following is a specification.

This invention relates to an improved camera attachment and has as its primary object to provide a device whereby an ordinary single lens camera may be focused from spaced points upon the arc of a circle having the subject as its center so that the combined views taken from the said points will present a true stereoscopic picture.

The invention has as a further object to provide a construction wherein the distance between the focus points of the camera will correspond to the distance between the human eyes so that the combined views taken from the said points will present a picture as would be seen by the eyes.

A still further object of the invention is to provide an attachment of the above described character employing a plurality of slide blocks mounted to travel in arcs of graduated radii and wherein a camera supporting plate will be provided for selective attachment to the said blocks to thus position the camera for taking pictures at different focal distances.

And the invention has as a still further object to provide an attachment which will be relatively simple in construction, which may be easily operated, and which may be employed in connection with substantially any conventional type of camera as now in common use.

Other and incidental objects will appear as the description proceeds and in the drawings wherein I have illustrated the preferred embodiment of the invention and wherein similar reference characters designate corresponding parts throughout the several views:

Figure 1 is a view showing my improved attachment in connection with a conventional type of camera and tripod, the attachment being shown in section to particularly illustrate the arrangement of the slide blocks of the device, Fig. 2 is a plan view particularly bringing out the manner in which the slide blocks are mounted to travel in arcs of different radii, Fig. 3 is a perspective view showing the type of channel plate employed to receive the slide blocks, the type of slide blocks employed and the type of retaining plate for holding the said slide blocks within the channel plates, Fig. 4 is a longitudinal sectional view taken through one of the channel plates, and Fig. 5 is a plan view on a slightly reduced scale showing the camera positioned upon the device for taking a picture at a ten foot radius with respect to the subject.

In carrying out the invention, I employ a preferably oblong base plate 10, with which is arranged to coact a camera supporting plate 11. These plates may be formed of wood or other suitable material and while I have shown such elements as partaking of the nature of plates, still I do not wish to be limited in this regard as, as shall presently appear, other elements not ordinarily contemplated by the term plates, could be substituted therefor. However, for the purposes of the present invention, the term plates shall be held to include such minor variations. Mounted in one extremity of the base plate 10 is a socket member 12 for detachably receiving the screw 13 of a tripod 14. The tripod and screw have been conventionally shown for convenience and it will be noted that the base plate 10 is arranged to be supported in horizontal position thereby. Set into the base plate at longitudinally spaced points are a plurality of transversely arranged channel members which, for convenience, have been indicated at 15, 16, 17 and 18 respectively. These channel members are all similar in construction and, as shown in detail in Fig. 3 of the drawings, are each provided with lateral flanges 19 countersunk into the top face of the base plate. The several channel members are curved longitudinally or respectively struck on the arc of a circle, the several circles represented being of graduated radii. Although different circles of appropriate radii may be chosen, I have, for convenience, illustrated the channel member 15 as struck on the arc of a two hundred foot circle, the channel member 16 as struck on the arc of a hundred foot circle, the channel member 17 as struck on the arc of a fifty foot circle and the channel member 18 as struck on the arc of a twenty foot circle, a radius of each of these circles being a distance very often used in focusing a camera upon a subject. However, it will of course be understood, as previously intimated, that the channel members may be struck on arcs other than those indicated. Formed in the bottom wall of each of the said channel members is a longitudinally curved slot 20 conforming to the arc of the said channel member and slidably mounted within the said channel members are a plurality of slide blocks, a typical one of which is shown in detail in Fig. 3 of the drawings. For convenience, these blocks have been indicated at 21, 22, 23 and 24 respectively. The side faces of the blocks are, in each instance, curved to conform to the curvature of the channel member receiving the block so that the said blocks may be readily shifted longitudinally within the channel members and, as particularly shown in Fig. 1 of the drawings, the upper faces of the blocks are disposed flush with the top face of the base plate 10. Formed on the upper sides of the blocks are lateral shoulders 25 and bearing over these shoulders are plates 26 for retaining the blocks within the channel members. The plates 26 are of the type shown in detail in Fig. 3 of the drawings and are countersunk into the top face of the base plate 10 to seat upon the flanges 19 of the said channel members. Extending through the plates as well as through the said flanges are a plurality of screws or other suitable fastening devices which not only act to secure the plates in position but also serve to connect the channel members with the base plate 10. The plates 26 are formed with longitudinally curved slots 27 to freely receive the upper terminals of the slide blocks and these slots are, of course, respectively struck upon an arc to conform to the arc of the channel member to which the different plates are secured. Formed through each of the slide blocks to register with the respective slots 20 in the bottom walls of the channel members is an opening 28 adapted to removably receive a clamp screw 29. This clamp screw is formed to removably fit through a collar 30 set into the camera supporting plate 11 and projects above the said plate for engagement with the socket of a camera and in Figs. 1 and 5 of the drawings, I have conventionally shown a camera at 31 as provided with a socket 32 receiving the said screw. The screw 29 is thus adapted to connect the plate 11 and camera 31 with any one of the slide blocks to move therewith and at its outer extremity is preferably formed with a collar 33 to fit within the slots 20 of the channel members so that the said screw may be readily shifted within the said slots.

The channel members 15, 16, 17 and 18 are each of such length that the slide block fitted therein may be moved to shift the clamp screw 29 when connected to each of the said blocks, a distance corresponding to the distance between the human eyes or about two and one-half inches. Accordingly, it will be seen that the block 21 may be shifted the length of a two and one-half inch segment of a circle having a hundred foot radius. In like manner, the block 22 may be shifted the length of a two and one-half inch segment of a circle having a fifty foot radius, while the blocks 23 and 24 may each be shifted the length of a two and one-half inch segment of a circle having, in one instance, a radius of twenty-five feet and in the other instance, a radius of ten feet. As shown in detail in Fig. 4 of the drawings, the slide blocks are arranged to engage the base plate 10 at the ends of the channel members for limiting the said blocks in their movement in opposite directions.

It will now be assumed that the subject which it is desired to take is one hundred feet distant from the camera. The camera is accordingly connected with the slide block 21, as illustrated in Fig. 1 of the drawings, when the said block is shifted to one end of the channel member 15 and the first exposure taken. The block is then shifted to the opposite end of the said channel member when the second exposure is taken, the first and second exposures being, of course, imposed upon separate negatives. The camera will thus be focused upon the subject from spaced points upon the arc of a circle having the subject as its center, a distance apart corresponding to the distance between the human eyes so that the combined views of the two exposures will present a true stereoscopic picture and a picture as would be seen by the human eyes. Were the subject fifty feet distant from the camera, the camera would then be connected with the slide block 22 and the two exposures taken, as previously described. In like manner, were the subject twenty-five feet distant from the camera, the camera would be connected with the slide block 23 for taking the two exposures from spaced points concentric to the subject. In Fig. 5 of the drawings, I have shown the camera connected with the slide block 24 for taking exposures of a subject ten feet distant. It will accordingly be seen that I provide an arrangement whereby the camera may be positioned upon the different slide blocks employed for taking exposures at different focal distances and in each position of the camera, the exposures taken will be from spaced points upon the arc of a circle having the subject as its center to thus insure the true depth of the stereoscopic picture presented by the said two exposures. Furthermore, it will be seen that my improved attachment may be employed in connection with substantially any conventional type of camera and, of course, the number of slide blocks to be used upon the base plate 10 may be varied as desired, as may also the different arcs in which the said blocks will be mounted to move for adapting the device for taking pictures at various different distances from the subject.

Having thus described the invention, what is claimed as new is:

1. A device of the character described including a base plate, and means shiftably mounted upon the said plate for supporting a camera selectively focused from spaced points upon the arc of a circle having the subject as its center.

2. A device of the character described including a base plate, and means mounted to travel in an arc upon the said plate and adapted to support a camera selectively focused at spaced points upon the said arc.

3. A device of the character described including a base plate, and a block mounted to travel in an arc thereon and adapted to support a camera selectively focused at spaced points upon the said arc.

4. A device of the character described including a base plate, an arcuate channel member carried thereby, and a block mounted to travel within the said channel member and adapted to support a camera selectively focused at points adjacent opposite ends of the said channel member.

5. A device of the character described including a base plate, an arcuate channel member carried thereby, a block mounted to travel within the said channel member, and a plate retaining the block within the channel member, the said block being adapted to support a camera selectively focused at spaced points with respect to the length of the channel member.

6. A device of the character described including a base plate, a channel member carried by the said plate and provided with flanges, a block mounted to travel within the said channel member, a plate overlying the channel member and retaining the block within the said member, and means connecting the said last-mentioned plate with the base plate and engaging through said flanges, the block being adapted to slidably support a camera for movement in an arc upon the base plate to be selectively focused at spaced points upon the said arc.

7. A device of the character described including a base plate, and spaced means mounted to travel upon the said plate in arcs of different radius and each adapted to support a camera selectively focused at spaced points upon the arc thereof.

In testimony whereof I affix my signature.

MAX WM. BEYER.